United States Patent [19]

Couëtoux

[11] Patent Number: 5,311,615
[45] Date of Patent: May 10, 1994

[54] METHOD OF CHANGING SPEEDS IN A MULTI-POLAR ELECRIC MOTOR OF THE CONSTANT FLUX TYPE, AND A MOTORIZED FAN UNIT WITH CHANGE OF SPEED CONTROLLED BY SUCH A METHOD

[75] Inventor: Hervé Couëtoux, Versailles, France

[73] Assignee: Valeo Thermique Moteur, Le Mensil-Saint Denis, France

[21] Appl. No.: 766,811

[22] Filed: Sep. 26, 1991

[30] Foreign Application Priority Data

Oct. 1, 1990 [FR] France .................. 90 12068

[51] Int. Cl.$^5$ ............................. H02P 7/285
[52] U.S. Cl. .................. 388/836; 388/934; 310/148
[58] Field of Search ............. 388/809-815, 388/830-836, 934; 310/136, 148-151

[56] References Cited

U.S. PATENT DOCUMENTS

| | | | |
|---|---|---|---|
| 517,105 | 3/1894 | Henderson | 318/246 |
| 542,667 | 7/1895 | Wightman | 388/850 |
| 669,299 | 3/1901 | Bassett | 318/263 |
| 857,165 | 6/1907 | Eichberg | 318/245 |
| 1,406,367 | 2/1922 | Fynn | 318/733 |
| 1,416,265 | 5/1922 | Charlet | 310/151 |
| 1,857,202 | 6/1929 | Lee | 318/726 |
| 2,199,601 | 6/1939 | Wallis | 318/244 |
| 2,761,074 | 5/1952 | Pestarini | 307/84 |
| 3,387,151 | 6/1968 | Selgin | 310/46 |
| 3,820,000 | 6/1974 | Smith | 318/139 |
| 4,264,847 | 4/1981 | Sanders, Jr. et al. | 388/839 |
| 4,827,897 | 5/1989 | Yamada et al. | 388/836 |

OTHER PUBLICATIONS

EPO No. 0076206 Apr. 1983, Aciers et Outillage Peugeot.
DE-A-1613198 May 1970.

Primary Examiner—William M. Shoop, Jr.
Assistant Examiner—David Martin
Attorney, Agent, or Firm—Morgan & Finnegan

[57] ABSTRACT

The invention provides a method of commutation control, for changing the speed of a direct current electric motor of the constant flux type, having an encapsulated inductive winding with n poles, each of which is supplied by a separate brush. In this method, a speed at a level i, where i is in the range 1 to n−1 inclusive, is obtained by connecting a group of i+1 brushes to the terminal of the direct current supply source. The state of connection of the brushes is modified in accordance with a control characteristic which comprises modifying the composition of the group of i+1 brushes to be connected in order to obtain a motor speed at a predetermined level i, and/or by interrupting the connection of one of two consecutive brushes to the brush previously connected during a speed changing operation.

9 Claims, 2 Drawing Sheets

5,311,615

METHOD OF CHANGING SPEEDS IN A MULTI-POLAR ELECRIC MOTOR OF THE CONSTANT FLUX TYPE, AND A MOTORIZED FAN UNIT WITH CHANGE OF SPEED CONTROLLED BY SUCH A METHOD

FIELD OF THE INVENTION

This invention relates to a method of controlling the commutation, and in particular a speed changing facility, of an electric motor, in particular a direct current electric motor.

More particularly, the invention relates to a method of commutation control for effecting changes in the speed of rotation of a direct current motor of the constant flux type comprising an encapsulated inductive winding having n poles, with each pole being supplied through a brush with direct current from a supply source.

BACKGROUND OF THE INVENTION

One arrangement for changing speeds in such a motor is described and shown in the specification of French published patent application No. FR 2 658 962A and U.S. Pat. No. 5,134,531 which is incorporated herein by reference. It enables a speed of rotation of the motor at a level i, where i is in the range 1 to n−1 inclusive, to be obtained by connecting a group of i+1 brushes of the motor to the terminals of the current supply source. Reference to that specification is invited for detailed information of the principle of the commutation control means and the various advantages that result from its use in practice. Its main advantages are its relatively low price and its reduced size.

Although such a commutation control means is satisfactory in operation, it is found that, in use, it does have the drawback of giving rise to irregular wear as between the various brushes that supply the poles of the inductive winding of the motor.

Brushes used in direct current motors are generally of the electro-graphitic type, made from amorphous carbon which is converted to graphite by high temperature heat treatment and consolidated with bonding agents. The wear to which these brushes are selected is partly mechanical, being linked to the general question of sliding friction of the brushes, but it is also partly electrical in nature.

Experiments carried out by the Applicant (i.e. the Applicant for the patent application in France on which this present application is based) have shown that wear that occurs for electrical reasons is in fact predominant over mechanical wear, and that this results in wear taking place more rapidly as a function of the extent to which each brush is conducting current. For this reason, the useful life of the direct current motor of the kind mentioned above can be substantially reduced if, as tends to happen, a single brush wears out prematurely.

DISCUSSION OF THE INVENTION

In order to overcome this drawback, the invention, in a first aspect thereof, proposes a method of controlling commutation for speed changing purposes in an electric motor of the direct current type mentioned above, characterised in that the method comprises modifying the state of connection of the brushes as a function of a control characteristic, by modifying the composition of the group of i+1 brushes to be connected in order to obtain a motor speed at a predetermined level i and/or by interrupting the connection of K brushes where K is equal to at least 1, and by establishing the connection of at least K+1 brushes, different from the brushes previously connected, during a speed changing operation.

The method in accordance with the invention makes it possible to redistribute the amount of wear that occurs in the various brushes as a result of their electrical connection, so as to tend to equalise the period of time during which each brush is electrically connected.

Among other, but optional, features of the invention are the following.

(a) The said control characteristic comprises selecting the composition of the group of at least one brush the connection of which is to be interrupted, as a function of the preceding state of connection and of a predetermined memorised selection sequence.

(b) The control characteristic comprises selecting the composition of the group of at least one brush the connection of which is to be interrupted, by random selection in a register of states of connection.

(c) The control characteristic comprises causing the state of connection of the brushes to be changed as a function of a time dependent parameter.

(d) The control characteristic comprises causing the state of connection to change with reference to either the magnitude of a physical parameter, or alternating occurrences of threshold values of the said physical parameter.

(e) The control characteristic comprises selecting the group of at least one brush as a function of a diagnosis of a predetermined number of preceding states of connection.

The method in accordance with the invention is particularly applicable for the speed control of a quadruple pole motor having four operating speeds, with one of the brushes being permanently connected to one terminal of the direct current supply source.

According to the invention in a second aspect, there is provided a motorised fan unit comprising a direct current electrical motor of the constant flux type, and motor speed changing means arranged to be controlled in accordance with the method of the invention in its said first aspect.

Preferably, this motorised fan unit further comprises control means responsive to the temperature to be controlled by operation of the motorised fan unit, such that commencement of operation of the unit causes the speed changing means to be switched.

The invention is especially applicable for controlling the operation of a motorised fan unit as used in motor vehicles, for cooling the engine of the vehicle.

Further features and advantages of the invention will appear more clearly from a reading of the description below, which describes a preferred embodiment of the invention, by way of example only and with reference to the accompanying drawings.

DESCRIPTION OF A PREFERRED EMBODIMENT OF THE INVENTION

This description of the method of commutation control for an electric motor in accordance with the invention is given with reference to its application to the control of commutation of a direct current electric motor having four poles (i.e. n=4 poles), of the kind adapted to run selectively at any one of three speeds in steps i of 1 to 3. These three speeds will be referred to in the conventional way here as "low speed" where i=1, "medium speed" where i=2, and "high speed" where i=3. FIGS. 1, 2 and 3 respectively show the different states of electrical connection of the four brushes of the motor at these three speeds respectively.

Figure 4:
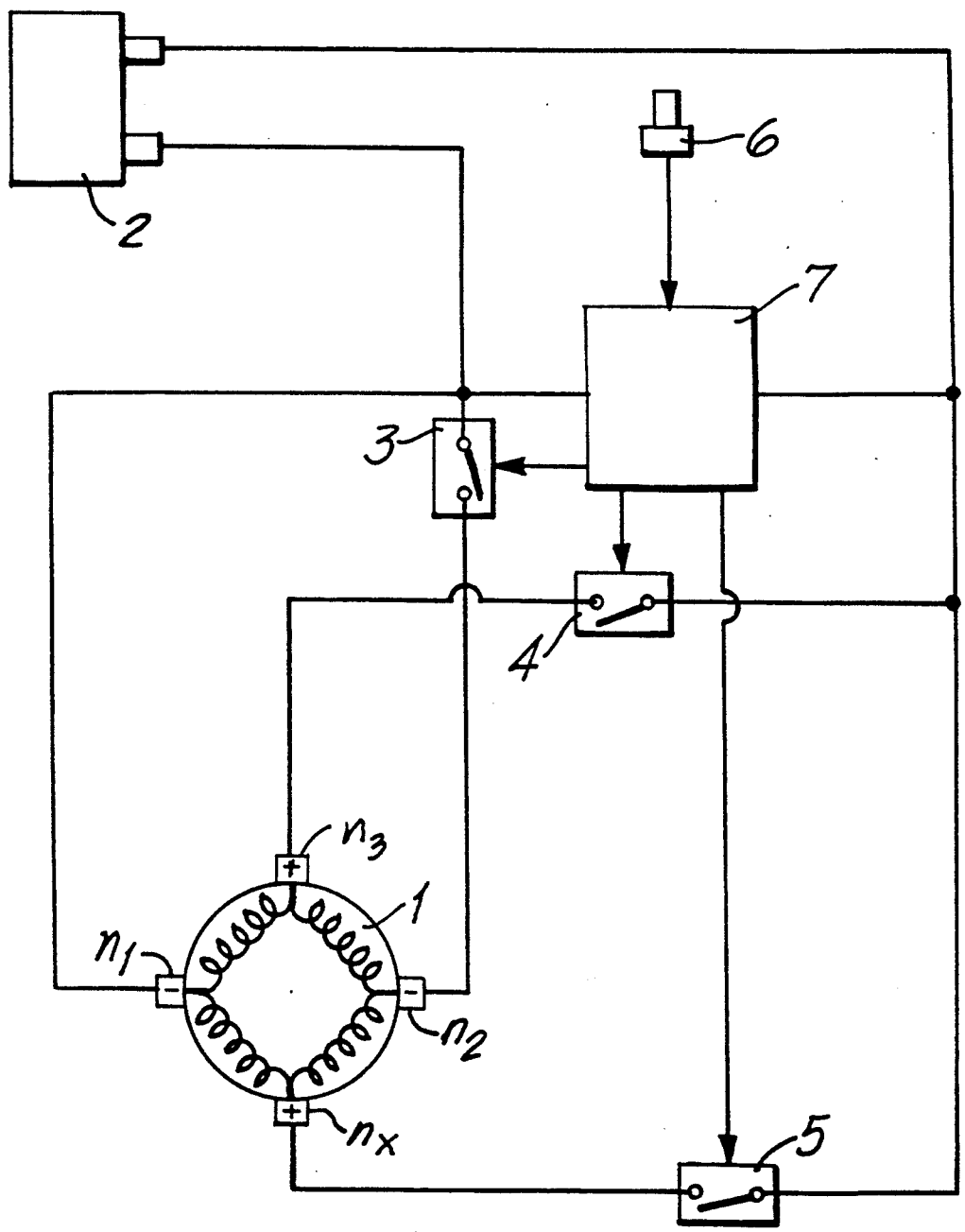
FIG. 4 is a schematic diagram of one embodiment of a motor control circuit in accordance with the present invention.

In the drawings, the motor M is shown diagrammatically with its four brushes B1, B2, B3 and B4. The motor M is also shown diagrammatically in FIG. 4, and can be of the type having encapsulated windings 1. In FIG. 4, the brushes, or poles, are labelled as $n_1$, $n_2$, $n_3$, and $n_x$. Beside each brush, in each Figure of the drawings, its state of electrical connection is indicated as follows. Where a brush is connected to one of the terminals of the supply source, this is indicated by a plus or minus sign, whereas the sign "o" is used to indicate that the brush is not supplied.

It should first be noted that the brush B1 is always connected to the terminal of negative polarity of the D.C. supply source.

In the French published patent specification FR 2 658 962A mentioned above, the speed changing means described uses the three states of connection of the brushes indicated in FIGS. 1a, 2a or 2c and FIG. 3, corresponding respectively to the three possible speeds for this type of quadruple pole motor. With this choice of states of connection of the brushes, it is seen that the brush B2 is always connected to the supply source, regardless of which speed changing step is concerned.

Figure 1A:
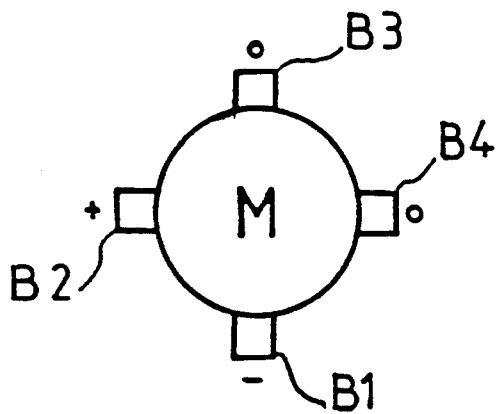
FIG. 1, which consists of two parts (FIGS. 1a and 1b) is a diagrammatic illustration representing commutation of a quadruple pole, direct current electric motor having three speeds, with FIG. 1 representing the low motor speed.
Figure 2A:
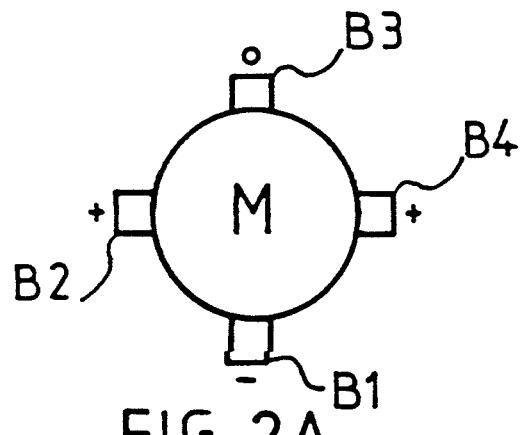
FIG. 2 consists of three diagrams, FIGS. 2a, 2b and 2c, all representing commutation of the same motor at medium motor speed.
Figure 2B:
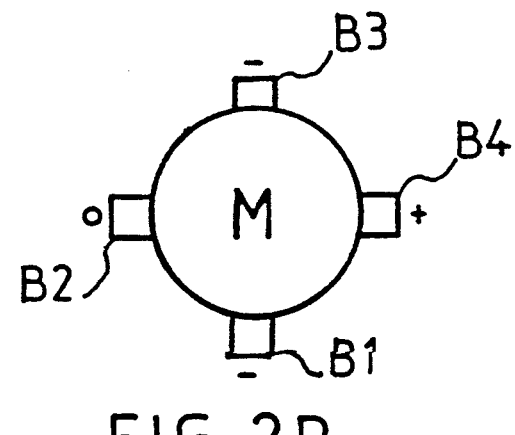
Figure 3:
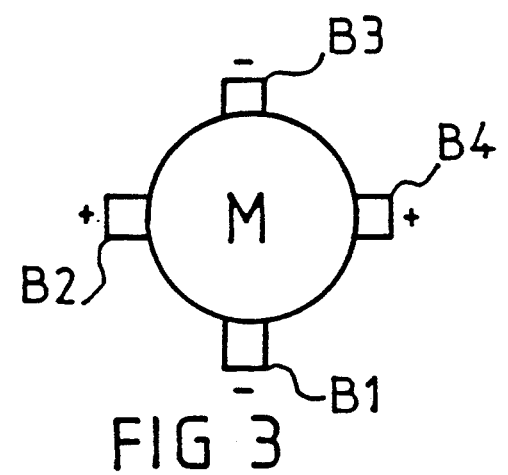
FIG. 3 illustrates the commutation of the same motor at high speed.

In order to overcome this drawback, the method illustrated in the accompanying drawings, for changing speed between the low speed and medium speed involves selecting for the medium speed the state of connection shown in FIG. 2b. In FIG. 2b, the brush B2 is not supplied, while the other three brushes B1, B3 and B4 are connected to the direct current supply source. If a convention is used whereby a state of connection is indicated by listing the brushes that are connected to the direct current supply source, then FIG. 1a represents the state B1-B2, while that in FIG. 2b is the state B1-B3-B4. Shifting therefore from the state B1-B2 to the state B1-B3-B4 has the effect of reducing wear on the brush B2. This results in giving a more equal distribution of the periods over which each of the brushes is supplied with current.

Figure 1B:
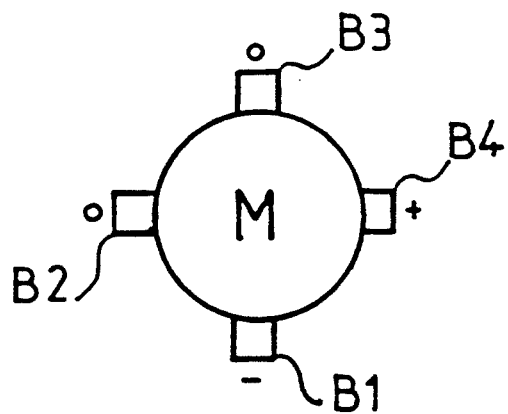
Figure 2C:
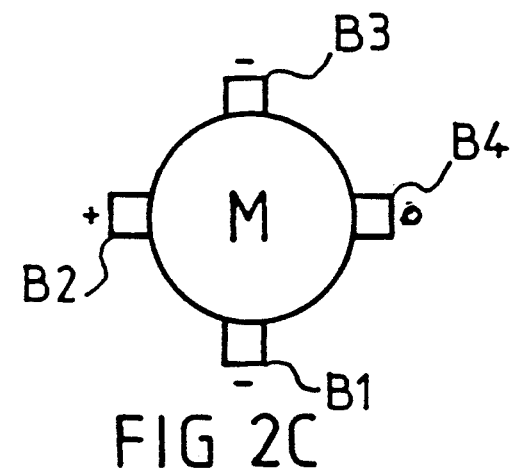

In the case in which the state of connection for low speed corresponds to that indicated in FIG. 1b, i.e. in the state B1-B4, it is of course desirable to use the state of connection shown in FIG. 2c, in order to obtain medium speed with the state B1-B2-B3, in which the brush B4 is out of use and the brush B2 is connected.

This first scheme of choice for states of connection can be applied during a speed changing operation. Thus, in operation at a speed of any predetermined level, that is to say at low speed or medium speed, it is also possible to change by varying the composition of the group of brushes connected to the supply source which is appropriate to this speed of rotation.

For low speed, it is thus possible to choose between the states represented in FIGS. 1a and 1b, i.e. between the state B1-B2 and B1-B4. To obtain medium speed, it is possible to choose between the states shown in FIGS. 2a, 2b and 2c, i.e. between the states B1-B2-B4 or B1-B3-B4 or B1-B2-B3.

As has been noted, all of the switching states which have been mentioned above correspond to the case in which the brush B1 is permanently connected to the negative terminal of the direct current supply source. However, the method in accordance with the invention is not limited to this type of connection, though this latter is particularly cost effective because it effects switching by means of a control system using only three independent relays depicted as switches 3, 4 and 5 in FIG. 4.

Control of the changes of state of connection, that is to say operation of the scheme which enables even distribution of wear to be maximised as between the various brushes, may be carried out in different ways. If a suitable memory means for memorising the preceding state of connection is used, it is possible to select the composition of the group of brushes to be connected in accordance with a predetermined selection sequence which is also carried in the memory. Thus for example, if a random number generator is used, the composition of the group of brushes (consisting of one or more brushes the supply to which is to be interrupted) can be effected by random selection in a register of states of connection. Control can be carried out, for example, by a logic control device 7, as shown in FIG. 4. Logic control device 7 senses a control characteristic and acts as a controller for disconnecting or connecting brushes in a desired configuration.

In the case in which the state of connection is changed without changing the operating speed, it is alternatively possible to use a time parameter, in order to use different states of connection for equal times over the period at which the motor is running at that speed.

It is also possible to use the derivation of a physical magnitude, or the hysteresis effect that gives alternating occurrences of threshold values for that physical magnitude. In the context of this scheme, it is of particular advantage to use the temperature of the motor, or the temperature of part of the cooling circuit, as the physical magnitude chosen to govern the switching scheme. A thermo contact device such as temperature sensor 6 in FIG. 4, can be used to detect the temperature concerned, its values having been already used in order to cause the appropriate speed of rotation of the motor to be selected in the manner described in the French published patent specification mentioned above. The output of the thermo contact device is applied to the logic control device 7 of FIG. 4. Logic control device 7 provides control inputs to relays 3, 4 and 5 to effect desired pole configurations based upon the sensed temperature.

It is also possible to take account of a diagnosis of the preceding states of connection, in order to modify the control characteristic in such a way as to give a more equal distribution of wear for each individual brush. This is especially the case where random number selection, and/or selection in response to the magnitude of a physical parameter is used.

The method of commutation control of the invention is not limited to use with quadruple pole motors. Thus it can be applied to any direct current motor of the multiple pole type having n poles, for which it is required to select a speed at a level i lying between 1 and $n-1$, by connecting a group of $i+1$ brushes of the motor to the terminals of the direct current supply source, with one brush always being connected to the supply source.

For example, and still in the context of a quadruple pole motor, it is possible to select any state of connection of any two consecutive brushes from the combinations possible with four brushes, in order to obtain low speed. This solution is however more costly, because it requires at least one relay, additional to the commutation control system, to be provided.

In general terms, and for the purpose of changing the states of connection that occur during a speed changing operation, it is necessary to interrupt the connection of K brushes previously connected to the supply source (where K is equal to at least 1), and to establish the connection of at least $K+1$ brushes different from the brushes previously connected, so as during the speed changing operation to modify the selection of brushes connected, and thus to give a reduction in their wear.

The economical solution where the brush B1 is continuously connected to the supply source is especially applicable when the method of commutation control is used for the control of speed changing in a motorised fan unit for supplying air in a motor vehicle. The most economical form, in practice, of the means for selecting the state of connection, is that which uses a memory to memorise the preceding state of connection.

What is claimed is:

1. A method for commutation control for changing the speed of an electric motor of the constant flux type having an encapsulated inductive winding driven by a direct current supply and having n poles and n brushes, each of said brushes being associated with one of said poles, the speed of said motor being dependent upon the number of said brushes that are connected to said power supply, said speed of the motor being represented by a level i, where i is in the range 1 to $n-1$ inclusive, said method comprising the steps of:
   (a) connecting $i+1$ of said brushes to the d.c. source to provide a first speed;
   (b) sensing a control characteristic;
   (c) disconnecting K of said $i+1$ brushes from said d.c. source in response to said control characteristic, where K is at least equal to 1; and
   d) connecting $K+1$ of said n brushes to said d.c. source, wherein at least one of said $i+1$ brushes connected in step (a) is not included in the $K+1$ brushes connected.

2. A method according to claim 1, wherein the step of disconnecting K of said $i+1$ brushes from said d.c. source is a function of the preceding state of connection of the brushes and of a predetermined memorized selection sequence.

3. A method according to claim 1, wherein the step of disconnecting K of said $i+1$ brushes from said d.c. source is effected by random selection in a register of states of connection.

4. A method according to claim 1, wherein the control characteristic comprises a time dependent parameter.

5. A method according to claim 1, wherein the control characteristic comprises a predetermined magnitude of a physical parameter.

6. A method according to any one of the preceding claims for control of speed changing in a quadruple pole motor, wherein one of the brushes is permanently connected to one terminal of the direct current supply source.

7. A method for commutation control of an electric motor of the constant flux type having an encapsulated inductive winding driven by a direct current supply and having n poles and n brushes, each of said brushes being associated with one of said poles, the speed of said motor being dependent upon the number of said brushes that are connected to said power supply, said speed of the motor being represented by a level i, where i is the range 1 to $n-1$ inclusive, said method comprising the steps of:
   (a) connecting $i+1$ of said brushes to the d.c. source to provide a motor speed;
   (b) sensing a control characteristic;
   (c) disconnecting K of said $i+1$ brushes from said d.c. source in response to said control characteristic, where K is at least equal to 1; and
   (d) connecting $K+1$ of said n brushes to said d.c. source, wherein at least one of said K brushes being connected is different from the particular $i+1$ brushes connected in step (a).

8. An apparatus for controlling a direct current electrical motor of the constant flux type having an encapsulated inductive winding drivable by a direct current supply and having n poles and n brushes, each of said brushes being associated with one of said poles, said motor including means for changing the speed of said motor, said speed being dependent upon the number of said brushes that are connected to said power supply, said speed of the motor being represented by a level i, where i is in the range of 1 to $n-1$, inclusive, comprising:
   (a) means for connecting $i+1$ of said brushes to the DC source to provide a first motor speed;
   (b) a control characteristic sensor; and
   (c) a controller responsive to said control characteristic sensor for disconnecting K of said $i+1$ brushes from said DC source, where K is at least equal to 1, and for connecting $K+1$ of said n brushes to said DC source, wherein at least one of said $i+1$ brushes connected to the DC source to provide said first speed is not included in the $K+1$ brushes connected.

9. The apparatus according to claim 8, wherein the control characteristic sensor is responsive to the temperature of the motor.

* * * * *